(12) United States Patent
Zhodzishsky et al.

(10) Patent No.: US 7,496,077 B2
(45) Date of Patent: Feb. 24, 2009

(54) METHOD AND SYSTEM FOR DYNAMICALLY CHANGING AUDIO STREAM BIT RATE BASED ON CONDITION OF A BLUETOOTH CONNECTION

(75) Inventors: Victor G. Zhodzishsky, North Potomac, MD (US); Ash Kapur, Frederick, MD (US); Jason Hillyard, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 642 days.

(21) Appl. No.: 11/109,021

(22) Filed: Apr. 7, 2005

(65) Prior Publication Data

US 2006/0036758 A1 Feb. 16, 2006

Related U.S. Application Data

(60) Provisional application No. 60/600,509, filed on Aug. 11, 2004.

(51) Int. Cl.
*H04Q 7/24* (2006.01)
(52) U.S. Cl. .................. 370/338; 370/346
(58) Field of Classification Search .............. None
See application file for complete search history.

(56) References Cited

U.S. PATENT DOCUMENTS

| | | | |
|---|---|---|---|
| 2002/0016165 A1* | 2/2002 | Davies et al. | 455/414 |
| 2002/0034172 A1 | 3/2002 | Ho | |
| 2002/0103554 A1* | 8/2002 | Coles et al. | 700/94 |
| 2002/0188745 A1 | 12/2002 | Hughes et al. | |
| 2003/0149810 A1 | 8/2003 | Kawamura | |
| 2005/0215197 A1* | 9/2005 | Chen et al. | 455/41.2 |
| 2006/0034300 A1* | 2/2006 | Barzegar et al. | 370/401 |

FOREIGN PATENT DOCUMENTS

| | | |
|---|---|---|
| EP | 1185038 A | 3/2002 |
| EP | 1341336 A | 9/2003 |
| WO | 02/13468 | 2/2002 |
| WO | 02/078229 | 10/2002 |

* cited by examiner

*Primary Examiner*—Duc C Ho
(74) *Attorney, Agent, or Firm*—McAndrews, Held & Malloy, Ltd.

(57) ABSTRACT

Methods and systems for controlling a personal area network access device are disclosed herein and comprise receiving at least one Bluetooth® event by a Bluetooth® device. A line speed used by the Bluetooth® device may be controlled based on the received Bluetooth® event. The line speed utilized by the Bluetooth® device may be dynamically adjusted based on the received Bluetooth® event associated with said Bluetooth device. The line speed may be dynamically adjusted utilizing a line speed algorithm. The line speed algorithm may comprise a variable bit rate coding algorithm. Encoded data may be transmitted by the Bluetooth® device utilizing the line speed. The encoded data may comprise encoded audio data. The line speed may be controlled based on a current line speed of the Bluetooth® device.

22 Claims, 12 Drawing Sheets

METHOD AND SYSTEM FOR DYNAMICALLY CHANGING AUDIO STREAM BIT RATE BASED ON CONDITION OF A BLUETOOTH CONNECTION

CROSS-REFERENCE TO RELATED APPLICATIONS/INCORPORATION BY REFERENCE

This application makes reference to, claims priority to, and claims the benefit of U.S. Provisional Application Ser. No. 60/600,509, filed Aug. 11, 2004 and entitled "Method and System for Dynamically Changing Audio/Video (A/V) Stream Bit Rate Based On The Condition Of A Bluetooth® Connection."

The above stated application is hereby incorporated by reference in its entirety.

FIELD OF THE INVENTION

Certain embodiments of the invention relate to wireless communication. More specifically, certain embodiments of the invention relate to a method and system for dynamically changing audio stream bit rate based on conditions of a Bluetooth® (BT) connection.

BACKGROUND OF THE INVENTION

Bluetooth® wireless technology is set to revolutionize personal connectivity by providing freedom from wired connections. Bluetooth® is a specification for a small form-factor, low-cost radio solution providing links between mobile computers, mobile phones and other portable and handheld devices.

Bluetooth® wireless technology is an international, open standard for allowing intelligent devices to communicate with each other through wireless, short-range communications. This technology allows any sort of Bluetooth® compliant device—from computers and cell phones to keyboards and headphones—to make its own connections, without wires, cables or any direct action from a user. Bluetooth® is currently incorporated into numerous commercial products including laptops, PDAs, cell phones, and printers, with more products coming out every day.

Bluetooth devices, such as mobile phones and PDAs, are evolving to become more complex as such devices may be adapted to transmit and receive audio information. For example, a Bluetooth® device may utilize a coder/decoder (CODEC) to encode audio information prior to communicating the encoded information to another Bluetooth® device, for example. Similarly, the CODEC may be utilized to decode encoded audio information received from another Bluetooth® device. During encoding by a conventional Bluetooth® device, the CODEC utilizes a fixed bit rate, or line speed, of the resulting encoded data. The bit rate may be based on the available bandwidth between the communicating Bluetooth® devices. In some instances, however, the bandwidth of a Bluetooth® connection between a transmitting and a receiving Bluetooth® device may become too small, which may cause a glitch in the audio in the receiving Bluetooth® device. This glitch may be annoying and unacceptable to a listener.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for dynamically changing audio stream bit rate based on conditions of a Bluetooth® (BT) connection, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

The Bluetooth® community has recently developed specifications that define how to use streaming audio over a Bluetooth® link. This opens up the technology to a whole new class of audio devices, such as wireless stereo headsets, wireless speakers, and wireless portable MP3 players just to name a few. With the introduction of new Bluetooth® specifications for streaming audio, new Bluetooth® products such as wireless stereo headsets and wireless file streaming applications are becoming a reality. The Bluetooth® streaming audio system is defined by three Bluetooth® specifications plus a number of ISO/IEC audio standards and RFC Internet standards.

Figure 1:
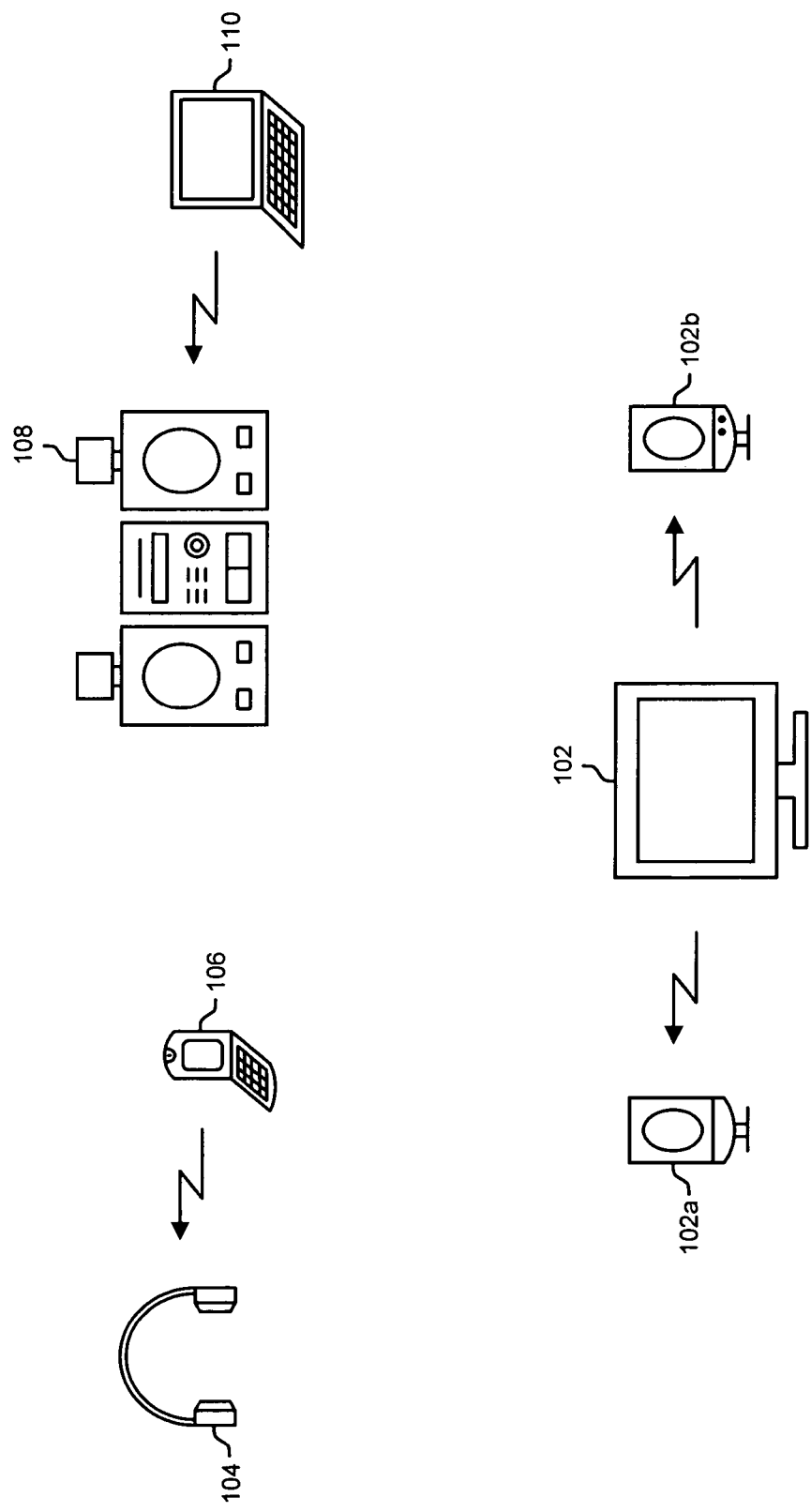
FIG. 1 is a diagram illustrating some examples of Bluetooth® (BT) streaming audio devices.

FIG. 1 is a diagram illustrating some examples of Bluetooth® (BT) streaming audio devices. Referring to FIG. 1, there is shown a stereo headset 104, a mobile phone 106, a Bluetooth®-enabled stereo system 108, personal computers (PC) 110 and 102, and stereo speakers 102a and 102b. The stereo headset 104 may receive streaming audio from MP3 files stored on the mobile phone 106. The headset 104 may also function as a normal Bluetooth® telephony headset for phone calls. The Bluetooth®-enabled stereo system 108 may receive streaming audio from MP3 files stored on the PC 110, solving the problem of how to get the MP3's from the PC 110 to the stereo system 108. The PC 102 may play stereo audio to the pair of Bluetooth® wireless speakers 102a and 102b, thus freeing the desktop from wired clutter.

Bluetooth® is a frequency hopping spread spectrum (FHSS) radio system operating in the 2.4 GHz unlicensed band. Its low power transmissions allow a typical range of about 10 meters. Devices may connect to each other to form a network known as a piconet, with up to seven active devices in the piconet. The maximum data throughput between devices is approximately 723 kilobits per second (kbps), with the data capacity shared between devices on the piconet.

Bluetooth® has a protocol stack to transfer data and implement the advanced features required by applications. The protocol stack may comprise several different protocols designed for different purposes. Various profiles, or applications, may reside above the protocol stack. Bluetooth® may also comprise a lower protocol stack for link management and baseband control.

Figure 2:
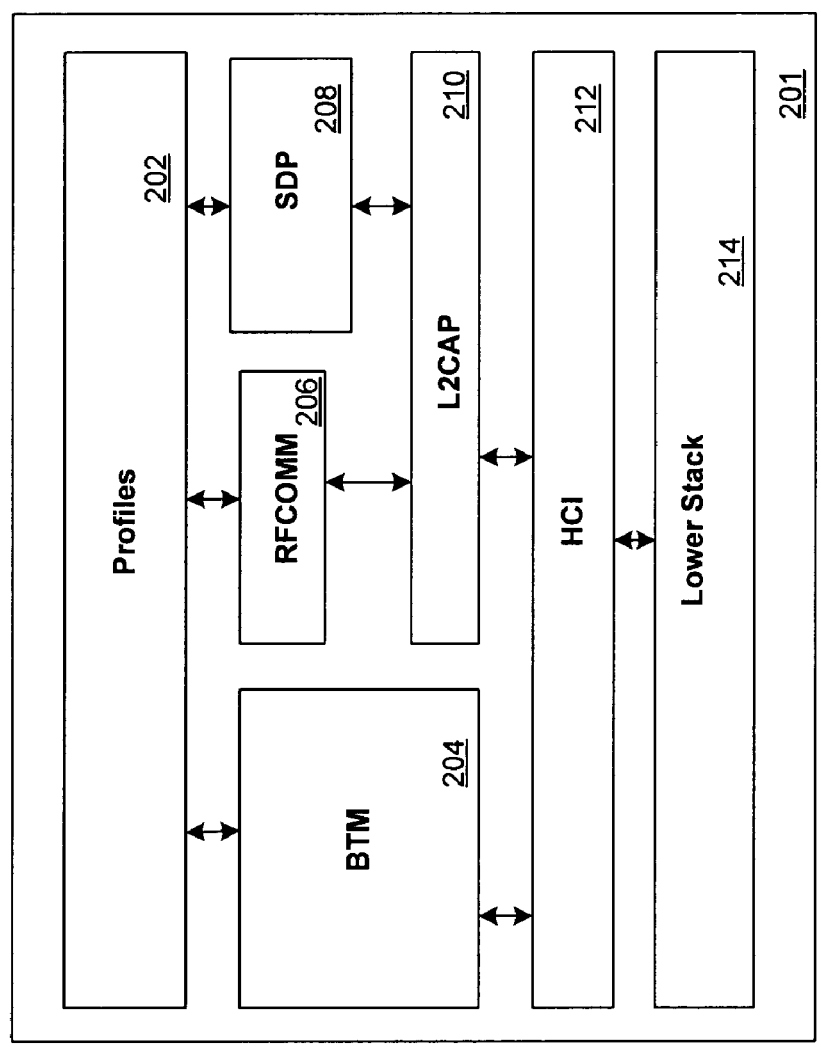
FIG. 2 is a simplified exemplary protocol stack.

FIG. 2 is a simplified exemplary protocol stack. Referring to FIG. 2, there is illustrated an exemplary Bluetooth® protocol stack 201. The exemplary Bluetooth® protocol stack 201 may comprise profiles layer 202, Bluetooth® management entity (BTM) layer 204, radio frequency communication (RFCOMM) protocol 206, service discovery protocol (SDP) 208, logical link control and adaptation protocol (L2CAP) 210, host controller interface (HCI) 212, and a lower stack 214. The profiles layer 202 may comprise profiles of one or more applications that may be utilized in connection with the Bluetooth® protocol stack. The BTM layer 204 makes it possible for various equipment to have wireless communication by integrating with a Bluetooth® module. The RFCOMM protocol 206 may be utilized to provide emulation of RS-232 serial ports over the L2CAP protocol, providing both transport capabilities for upper level services, such as OBEX, that use serial line as the transport mechanism.

The SDP 208 may be utilized for querying Bluetooth® device information, Bluetooth® device services, and characteristics of the services. The L2CAP 210 may be utilized to support higher level protocol multiplexing, packet segmentation and reassembly, and quality of service (QoS). L2CAP 210 may permit higher-level protocols and applications to transmit and receive data packets up to 64 kilobytes in length. The HCI 212 may be adapted to provide a command interface to the baseband controller, link manager, and access to hardware status and control registers.

Figure 3:
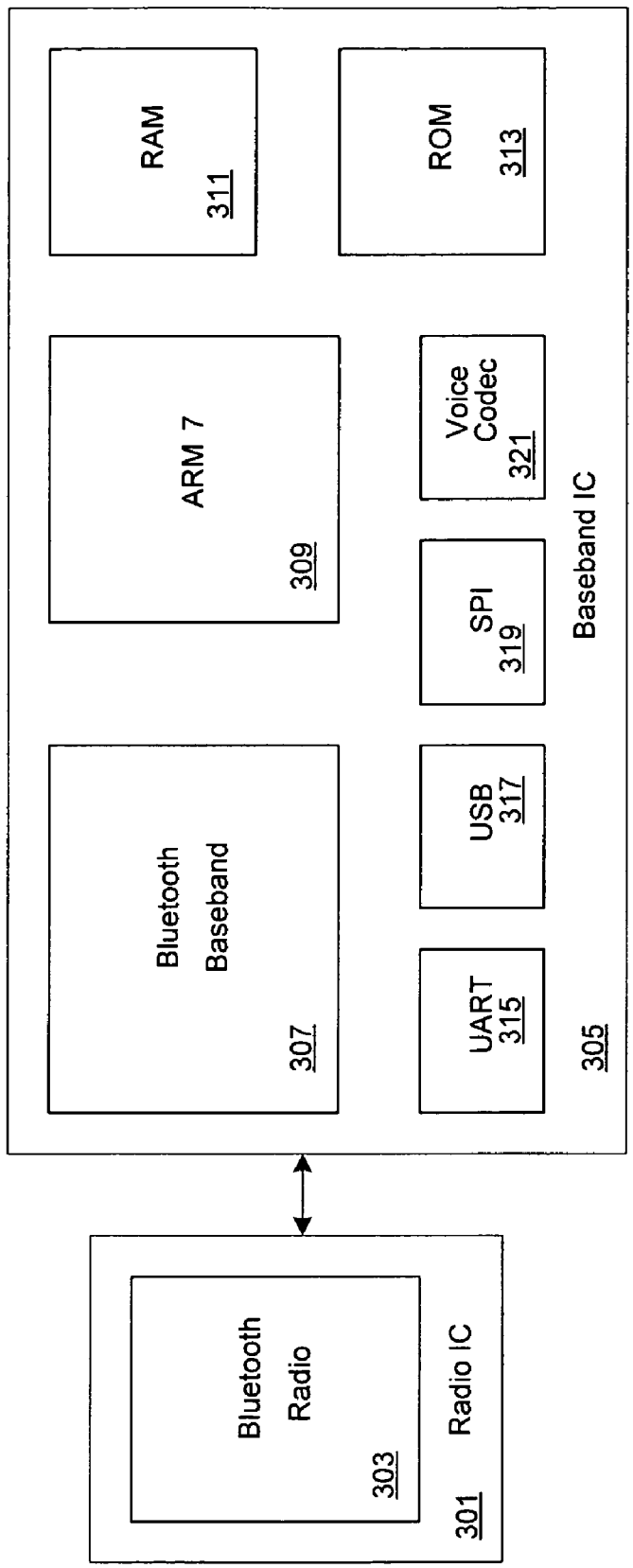
FIG. 3 is a block diagram illustrating an exemplary Bluetooth® hardware implementation.

Bluetooth® hardware implementations are typically highly integrated systems consisting of one or two chips. FIG. 3 is a block diagram illustrating an exemplary Bluetooth® hardware implementation. Referring to FIG. 3, the Bluetooth® hardware implementation may comprise a Bluetooth® baseband integrated circuit (IC) 305 and a radio IC 301. The radio IC 301 may comprise a Bluetooth® radio circuit 303. The baseband IC 305 may comprise Bluetooth® baseband circuit 307, ARM7 processor 309, random access memory (RAM) 311, read only memory (ROM) 313, voice codec 321, a serial peripheral interface (SPI) 319, universal serial bus (USB) 317, and universal asynchronous receiver/transmitter (UART) 315. The radio IC 301 may be implemented in a separate chip. The ARM7 processor 309 may be adapted to operate all the required software including lower stack, upper stack, and embedded profile, for example. This type of single CPU implementation allows for a small, low power, and low cost solution.

The 723 kbps throughput of a Bluetooth® link may be suitable for streaming audio utilizing MP3 and/or other codec formats. Bluetooth® streaming audio may be defined by three Bluetooth® specifications covering the protocol and profiles: AVDTP, GAVDP, and A2DP. The Audio/Video Distribution Transport Protocol (AVDTP) is the protocol designed especially for Bluetooth® streaming audio and video. It may perform the signaling to configure, open, and/or close a stream between two devices. Audio stream data may be transferred utilizing real-time protocol (RTP) packets. AVDTP sits in the protocol stack above L2CAP and may utilize separate L2CAP channels for signaling and data. The Generic Audio/Video Distribution Profile (GAVDP) is an abstract profile that defines how applications can use AVDTP. The Advanced Audio Distribution Profile (A2DP) defines how Bluetooth® streaming audio applications work. It defines how to get and set audio codec parameters for MPEG and/or other codecs. The A2DP may also define the media payload formats for packaging audio stream data into packets and may contain the specification for a new audio codec called SBC.

Figure 4:
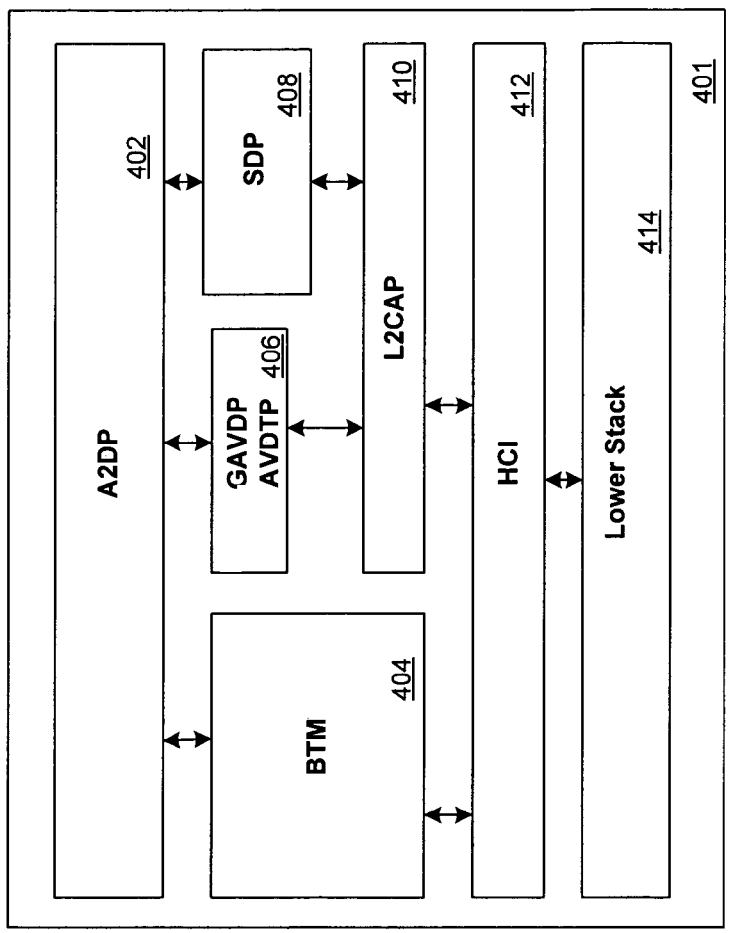
FIG. 4 is a block diagram illustrating a Bluetooth® protocol stack for streaming audio.

FIG. 4 is a block diagram illustrating a Bluetooth® protocol stack for streaming audio. Referring to FIG. 4, the Bluetooth® protocol stack for streaming audio 401 may comprise A2DP 402, Bluetooth® management entity (BTM) protocol 404, GAVDP/AVDTP 406, service discovery protocol (SDP) 408, logical link control and adaptation protocol (L2CAP) 410, host controller interface (HCI) 412, and a lower stack 414. In addition to the Bluetooth® specifications illustrated on FIG. 4, there are several ISO/IEC and Internet RFC specifications used for Bluetooth® streaming audio, which are summarized in Table 1.

TABLE 1

Additional specifications used for Bluetooth ® streaming audio

| Specification | Description |
|---|---|
| ISO/IEC 11172 part 3 | MPEG audio |
| ISO/IEC 13818 part 3 | MPEG audio |
| ISO/IEC 13818 part 7 | MPEG advanced audio |
| ISO/IEC 14496 part 3 | MPEG advanced audio |
| RFC 1889 | Real-time protocol (RTP) |
| RFC 2733 | RTP error correction |
| RFC 3095 | Packet header compression |
| RFC 2250 | RTP payload format |
| RFC 3016 | RTP payload format |
| RFC 3119 | RTP payload format |

Figure 5:
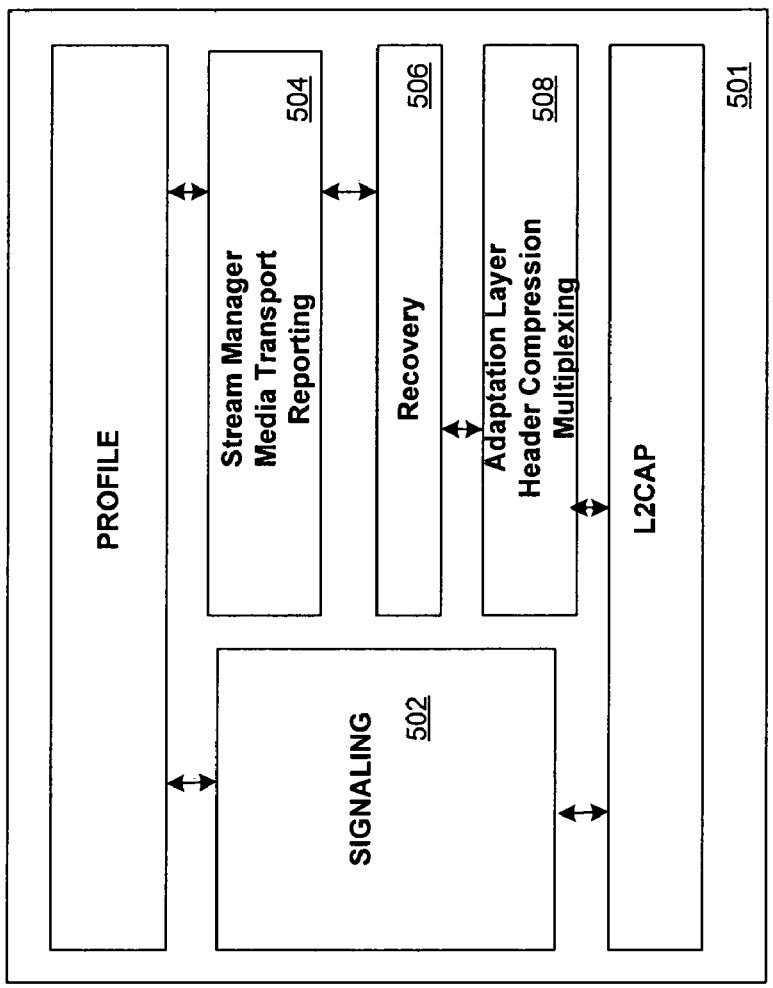
FIG. 5 is a block diagram illustrating AVDTP protocol features.

The bulk of the Bluetooth® streaming A/V system may be implemented in the AVDTP protocol. FIG. 5 is a block diagram illustrating AVDTP protocol features. Referring to FIG. 5, the AVDTP protocol may comprise a portion of the Bluetooth® protocol stack 501 and may be divided into four subsystems: signaling 502, stream management 504, recovery 506, and adaptation layer 508. AVDTP signaling messages 502 are used to discover, configure, open, and close a stream between two devices. There are eleven message types with some messages being optional.

A media transport feature of the stream manager 504 may be utilized to transfer RTP packets containing audio data. This feature is a required feature of AVDTP. The reporting feature of the stream manager 504 may allow link quality information, such as jitter and packet loss, to be exchanged utilizing the protocols defined in RFC 1889. This is an optional feature. The recovery feature 506 adds extra packets containing error correction data to the packet transfer. This feature may allow for lost packets to be recovered. The recovery mechanism is defined by RFC 2733. This is an optional feature and may require additional ROM and/or RAM.

A header compression feature of the adaptation layer 508 allows the RTP header to be compressed, as defined by RFC 3095. When used with AVDTP, the RTP header may be reduced by 5 to 7 bytes. This savings may probably not be worth the effort of implementing the feature especially when large media packets are used. A multiplexing feature of the AVDTP adaptation layer 508 allows L2CAP channels to be shared by media, reporting, and/or recovery packets, therefore resulting in fewer L2CAP channels and better baseband channel capacity utilization. This complex feature may be useful for devices which use multiple simultaneous streams with reporting and recovery.

A device implementing Bluetooth® streaming audio may need to consider several issues, which are not fully covered by the Bluetooth® specifications. Such issues may be related to implementation of optional features, multiple streams support, and/or data flow and synchronization issues, for example. One or more of these issues may be beyond the scope of the Bluetooth® specification.

Figure 6:
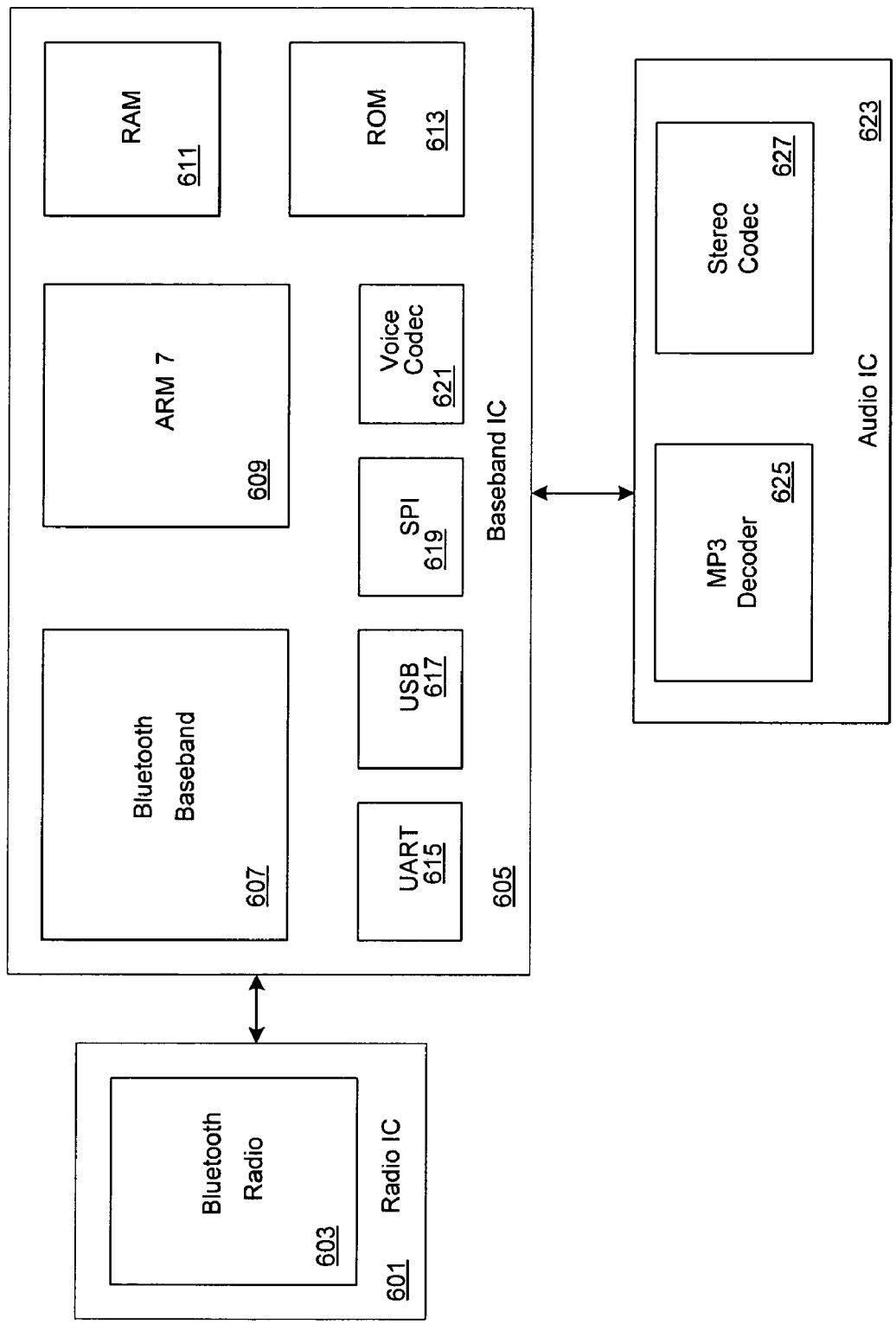
FIG. 6 is a block diagram illustrating an exemplary hardware implementation for streaming audio playback.

FIG. 6 is a block diagram illustrating an exemplary hardware implementation for streaming audio playback. Referring to FIG. 6, the Bluetooth® hardware implementation for streaming audio playback may comprise a Bluetooth® baseband integrated circuit (IC) 605, a radio IC 601, and an audio IC 623. The radio IC 601 may comprise a Bluetooth® radio circuit 603. The audio IC 623 may comprise an MP3 decoder 625 and a stereo codec circuit 627. The baseband IC 605 may comprise Bluetooth® baseband circuit 607, ARM7 processor 609, random access memory (RAM) 611, read only memory (ROM) 613, voice codec 621, a serial peripheral interface (SPI) 619, universal serial bus (USB) 617, and universal asynchronous receiver/transmitter (UART) 615. The radio IC 601 and the audio IC 623 may be implemented in separate chips. The ARM7 processor 609 may be adapted to operate all the required software including lower stack, upper stack, and embedded profile, for example. Data received over the Bluetooth® link may be processed by the protocol stack and passed to an application. The application may acquire the audio stream data and may communicate it over a hardware interface to the audio IC 623. The audio IC 623 may decode the digital audio and may convert the audio signal to analog signal.

Implementing AVDTP with the minimum required features may require multiple streams support. For the simple streaming audio device examples shown in FIG. 1, optional features such as recovery, reporting, header compression, and multiplexing may not be required as Bluetooth® devices may be adapted to perform adequately without such features.

Maintaining a data transfer with a constant bit rate on a Bluetooth® link may be difficult to achieve. If data is sent too slowly, the audio decoder may run out of stream data to process, causing an audible error. Lost data packets may also cause the same problem. On the other hand, if data is sent too quickly, then data may be buffered up at the audio decoder, eventually causing congestion or data loss when the device runs out of buffer space. Since there is no flow control mechanism built into AVDTP or L2CAP, other mechanisms may be utilized to prevent data loss. The mechanism used by the audio source, or device sending the stream, may depend on the type of source. If the source is "live" and audio stream data is provided by an audio encoder, then the encoder itself may provide the constant bit rate. If the source is from a file, then a timer may be utilized to maintain a constant bit rate.

To understand the idea behind using a timer, consider this example. A device is sending an MP3 stream from a file encoded at 128 kbps and 48 kHz sample frequency. Referring to Table 2a, this means an MP3 audio frame 384 bytes long is sent every 24.0 ms. If the device simply sets a periodic timer for 24.0 ms and sends a packet when the timer expires, the constant bit rate will be maintained.

TABLE 2a

Audio frame sizes for SBC and MP3.
Audio Frame Size vs. Data Rate and Sample Frequency

|  | SBC* | | | MP3 | | |
|---|---|---|---|---|---|---|
|  | 64 kbps | 128 kbps | 320 kbps | 64 kbps | 128 kbps | 320 kbps |
| 48 kHz | 20 | 42 | 108 | 192 | 384 | 960 |
| 44.1 kHz | 22 | 46 | 118 | 209 | 418 | 1045 |
| 32 kHz | 32 | 64 | 162 | 228 | 576 | 1440 |

TABLE 2b

Audio frame periods for SBC and MP3. Audio Frame Period vs. Sample Frequency

|  | SBC* | MP3 |
|---|---|---|
| 48 kHz | 2.667 ms | 24.0 ms |
| 44.1 kHz | 2.902 ms | 26.122 ms |
| 32 kHz | 4.0 ms | 36.0 ms |

SBC frames may be small with a short period, as illustrated in Table 2b with regard to several typical values for SBC and MP3 audio frame periods. Some devices may have problems using timers or processing data at such short intervals. This suggests that rather than send a small packet containing a single frame at very short intervals, a larger packet containing several frames at longer intervals may be communicated instead. The maximum size of MP3 frames may correspond to the L2CAP MTU of the AVDTP transport channel, such that audio frames may not need to be fragmented across AVDTP packets.

Consider an example, in which a packet is sent every 24 ms. Consider what happens if the timer isn't so accurate and the packet actually gets sent at 20 ms or 29 ms. If a packet arrives late, the audio decoder may run out of data. Therefore, even a slight inaccuracy may cause malfunction if every packet is expected to be sent on time. A better approach would be to provide some slack in the data flow. Assuming the device receiving the stream is adapted to buffer up at least a few packets, a number of packets may be communicated as fast as possible when streaming starts. This helps with timer inaccuracy and data delayed by lost packets as well. The amount of packets that may be buffered may depend on the specific implementation of the device receiving the stream. The device receiving the stream may also improve the data flow. Regardless of how fast or slow the peer is sending the stream, the device receiving the stream can smooth out the flow by delaying playback until a number of packets have been received. This helps with timer inaccuracy and data delayed by lost packets.

When more than one stream is transferred between devices, the stream playback may be synchronized. Consider the example of the wireless PC speakers shown in FIG. 1. The PC may communicate a Bluetooth® audio stream to each speaker. There are actually two synchronization problems in this example. First, the audio playback of the two speakers may need to be synchronized with each other. Second, the audio playback may need to be synchronized with the display on the PC. Although the Bluetooth® specifications do not cover synchronization issues, there are some features of the system that may be utilized to address these synchronization problems.

Every Bluetooth® device has a free-running system clock, which determines the timing of the frequency-hopping transceiver. In a piconet, the slave devices are synchronized to the master's system clock. The speakers may both be synchronized to the Bluetooth® clock timing of the PC. Depending on the implementation of the Bluetooth® chip, it may be possible for an application to derive a timer based on the PC clock. The PC clock may be utilized in conjunction with the RTP presentation timestamp in the packet to synchronize the playback. Therefore, it may be possible to utilize the piconet timing as a synchronization source between the two speakers.

The second part of the synchronization problem boils down to how much delay is present from when the PC sends the audio stream to when the speakers play it back. Studies show that a delay larger than 80 ms may be noticeable in situations like this. As discussed earlier, however, it may be desirable for the device receiving a stream to buffer up a few audio frames before playback to help maintain a constant data rate on the link. This 80 ms limit may be an upper bound of how many frames to buffer. For example, an MP3 stream sampled at 44.1 kHz has a frame period of 26.122 ms. Therefore, no more than three frames may be buffered to keep delay under the timing corresponding to the limit.

Certain embodiments of the invention may be found in a method and system for dynamically changing audio stream bit rate based on conditions of a Bluetooth® (BT) connection. Coded audio information may be sent via BT and an encoder such as an SBC CODEC defined by the BT specification, may be configured to dynamically change a bit rate of the resulting encoded data based on at least one of a plurality of Bluetooth® events. The CODEC may be adapted to allow the bit rate, or line speed, of the resulting data stream to be configured on the fly. In this regard, every time a frame is encoded to be sent, for example every few milliseconds, the bit rate of the resulting encoded frame may be changed. The CODEC may utilize a variable bit rate algorithm to dynamically change the bit rate of the resulting encoded data. Aspects of the invention may be applicable to any CODEC that allows variable bit rate encoding of a data stream, such as an audio data stream or video stream.

In general, the higher the bit rate, the higher the resulting audio quality. However, there are circumstances when the stream rate needs to be reduced since there are other factors affecting the bandwidth of a BT connection. In some instances, if the stream rate is not reduced, this may negatively impact the quality of the BT connection. For example, if audio cannot be sent to a device such as an audio player in a timely fashion, then this may cause a glitch in the audio, which may be very aurally unpleasant and annoying to a user of the audio player. Accordingly, one aspect of the invention provides a tradeoff under circumstances when a BT connection may not possess adequate bandwidth to send the best quality connection, which may cause a glitch to occur. Under such circumstances, rather than causing a glitch to occur, the bit rate or line rate of the encoded data stream may be reduced on the fly.

The algorithm may be executed on-chip and some of the processing may also occur off-chip. Additionally, any combination of software and hardware may be utilized to dynamically change a bit rate of data to be transmitted over the BT connection so as to mitigate the effects of any unwanted artifacts which may occur when the available bandwidth of the BT connection decreases.

Figure 7:
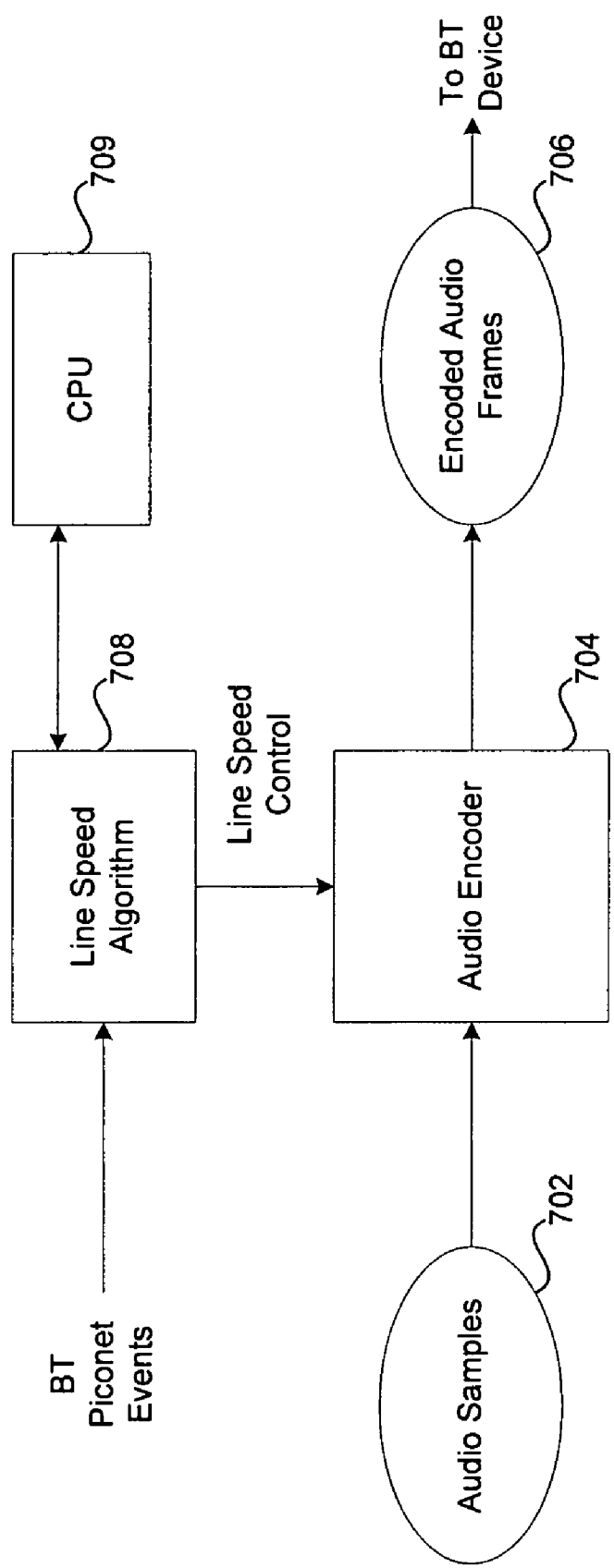
FIG. 7 is a block diagram of an exemplary system for dynamically changing audio stream bit rate based on conditions of a Bluetooth® (BT) connection, in accordance with an embodiment of the invention.

FIG. 7 is a block diagram of an exemplary system for dynamically changing audio stream bit rate based on conditions of a Bluetooth® (BT) connection, in accordance with an embodiment of the invention. Referring to FIG. 7, there are shown audio samples 702, audio encoder 704, encoded audio frames 706, line speed or data rate algorithm 708, and a central processing unit (CPU) 709.

The audio samples 702 may be raw digitized audio signals, which comprise digitized audio that have not been coded in order to compress it. The audio encoder 704 may be, for example, an SBC audio encoder, an MPEG 1, 2 audio encoder, an MPEG 2, 4 advanced audio coding (MC) audio encoder, an Advanced Range Testing, Reporting, and Control (ARTRAC) audio encoder, or other suitable audio encoder. The audio encoder 704 may be a variable rate audio encoder, which may comprise a line speed control signal and may be adapted to receive input from the line speed algorithm 708. The encoded audio frames 706 are the output frames, which have been encoded by the audio encoder 704 based on the line speed control signal generated by the line speed algorithm 708.

The line speed or data rate algorithm 708 may be any combination of hardware and software controlled. The line speed algorithm 708 may be adapted to receive Bluetooth® (BT) piconet events. Based on the received Bluetooth® events, the CPU 709 may be adapted to generate one or more line speed control signals and/or parameters that control the audio encoder 704. In an exemplary aspect of the invention, the line speed control signals and/or parameters that control the audio encoder 704 may comprise a "line speed increase" signal, a "line speed decrease" signal, and/or a "set line speed" signal. The "set line speed" signal may be utilized to set line speed to a specific value.

In operation, the audio samples 702 are input to a variable-rate audio encoder 704, for example MP3 or Bluetooth® SBC. The line speed control, which is an input to the audio encoder 704, may control the bit rate of the encoded audio frames 706 in the output bit stream. The line speed, or rate at which the input audio samples 702 are encoded, may be determined and controlled by the line speed algorithm 708. The CPU 709 may be adapted to determine an appropriate line speed, or bit rate, depending on the BT piconet event information that is received by the line speed algorithm 708. The output encoded audio frames may be communicated to a peer device over a Bluetooth® connection.

Figure 8:
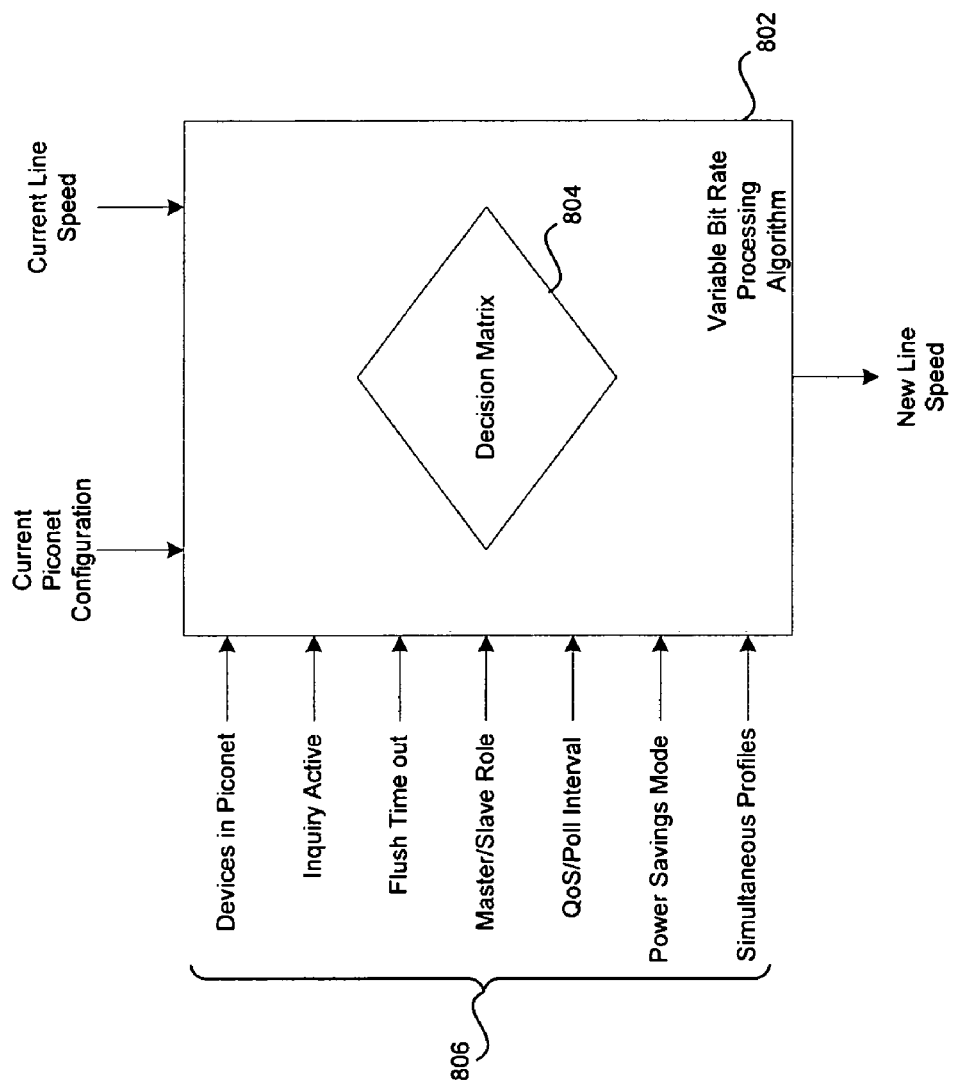
FIG. 8 is a block diagram illustrating a decision making process implemented by a variable bit rate processing algorithm, in accordance with an embodiment of the invention.

FIG. 8 is a block diagram illustrating a decision making process implemented by a variable bit rate processing algorithm, in accordance with an embodiment of the invention. Referring to FIG. 8, there is shown a variable bit rate processing algorithm 802, a decision matrix and a plurality of BT piconet events 806.

The variable bit rate processing algorithm 802 may be controlled in any combination of hardware and software. The decision matrix 804 may comprise suitable logic, circuitry and/or code that may be adapted to adjust the current line speed based on one or more of the current piconet configuration and/or the BT piconet events 806. The BT piconet events 806 may comprise the following exemplary events: a device in piconet event; an inquiry active event; a flush time out event; a master/slave role event; a QoS/poll interval event; a power savings mode event, and a simultaneous profiles event. Based on one or more of these events and/or on the current piconet configuration, the line speed may be determined by the variable bit rate processing algorithm, 802 and passed to the audio encoder 704 (FIG. 7).

A device in piconet event is an event that may indicate the number of devices currently connected in a piconet. An inquiry active event may indicate that a current Bluetooth® device is in an inquiry state. A Bluetooth® device in an inquiry state may be adapted to search for active devices in a piconet. A flush time out event, or a flush-occurred event, may be generated by a Bluetooth® device when the Bluetooth® device is not able to transmit and/or receive packetized data within a determined time range. In this regard, if a flush time out occurs, the Bluetooth® device may flush the timed out data. A master/slave role event may indicate whether a current Bluetooth® device is in a master or slave role. A Bluetooth® device in a scatternet may be in a master and in a slave role simultaneously with different Bluetooth® devices.

A quality of service (QoS)/poll interval event, or a QoS violation event, may be used to indicate that a Bluetooth® device is unable to provide a current QoS requirement for a connection handle. This event may indicate that the Bluetooth® device link manager is unable to provide one or more of the agreed QoS parameters. A power savings mode event may indicate whether a Bluetooth® device is in a power savings mode, for example a sniff mode. A simultaneous profiles event may indicate whether the Bluetooth® device has initiated support for simultaneous Bluetooth® device profiles.

Referring to FIG. 8, various Bluetooth® piconet events may be utilized as inputs to a decision matrix 804. A current piconet configuration and a current line speed may also be utilized as inputs to the decision matrix 804. When a new piconet event occurs, the decision matrix or look up a new line speed. In accordance with an embodiment of the invention, the line speed for a particular piconet configuration may be preprogrammed and the decision matrix may be adapted to determine an optimal or best line speed to be used based on the piconet event, the current piconet configuration, and/or the current line speed. The invention need not be limited to having preprogrammed line speeds. Accordingly, in other embodiments of the invention, line speed may be increased or decreased incrementally based on the piconet event, the current piconet configuration, and/or the current line speed.

For example, the decision matrix 804 within the variable bit rate processing algorithm 802 may be programmed to set the line speed to a specific value based on a specific piconet event. Each of the piconet events, such as device in piconet event, inquiry active event, flush time out event, master/slave role event, QoS/poll interval event, power savings mode event, and simultaneous profiles event, may occur at separate times and the decision matrix 804 may set the line speed to a preprogrammed value corresponding to the currently occurring piconet event. In another aspect of the invention, the decision matrix 804 may be adapted to increase or decrease a current line speed by a preset amount based on a currently occurring piconet event.

In accordance with an embodiment of the invention, when a device in piconet event is received by the decision matrix 804, the decision matrix 804 may determine whether the received piconet event corresponds to a preset line speed or whether the received piconet event corresponds to a preset increase, or decrease, in the current line speed. If the decision matrix 804 determines that the received piconet event corresponds to a preset line speed, then the current line speed may be set to the preset line speed. If the received piconet event corresponds to a preset increase, or decrease, in the current line speed, the decision matrix may increase, or decrease, the current line speed by the preset amount. In accordance with an embodiment of the invention, the preprogrammed line speeds may be tailored to suit the needs or requirements, of a particular device or application. For example, a PC may use preprogrammed line speeds of 320, 230, and/or 160 kbps, while a PDA may use lower speeds of 192 and 160 kbps.

Even though the variable bit rate processing algorithm 802 is adapted to adjust a line speed of a Bluetooth® audio bit stream, the present invention may not be so limited. Accordingly, in accordance with an aspect of the invention, the variable bit rate processing algorithm 802 may also be adapted to adjust a line speed of a Bluetooth® video bit stream.

Figure 9A:
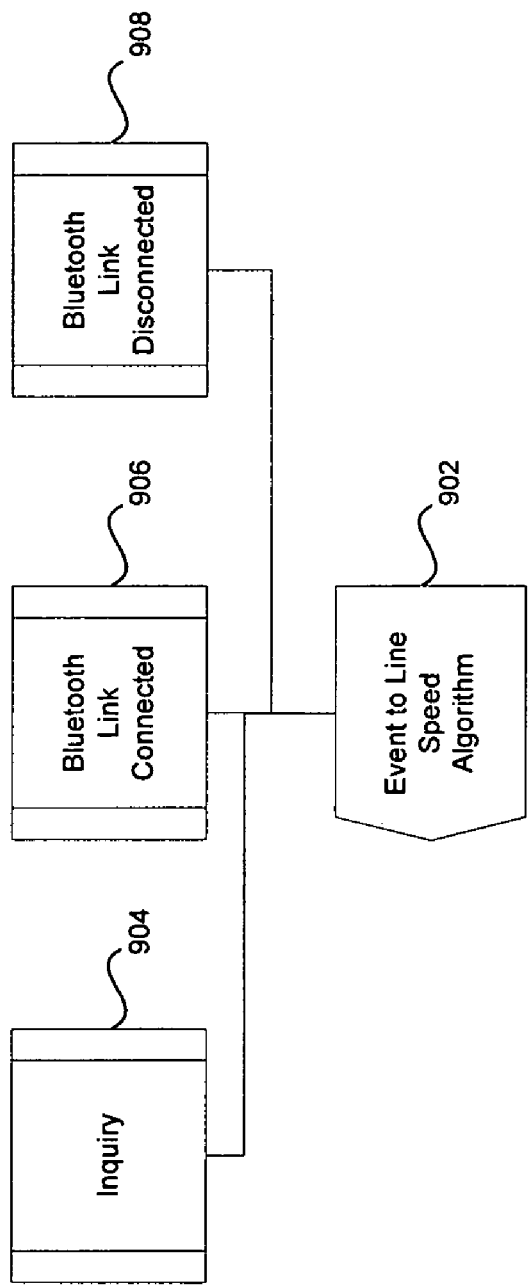
FIG. 9a is a block diagram illustrating the transfer of line speed algorithms to the line speed control algorithm, in accordance with an embodiment of the invention.

FIG. 9a is a block diagram illustrating the transfer of line speed algorithms to the line speed control algorithm, in accordance with an embodiment of the invention. Referring to FIG. 9a, there is shown an event to line speed algorithm block 902, an inquiry process block 904, Bluetooth® link connected 906 event, and Bluetooth® line disconnected event 908.

The start and stop of Bluetooth inquiry process 904 may be utilized by the line speed algorithm block 902 to determine a new line speed. Whenever a BT link is connected, a Bluetooth® link connected event 906 may be communicated to the event to line speed algorithm block 902. Similarly, whenever a BT link is disconnected, a Bluetooth® link disconnected event 906 may be communicated to the event to line speed algorithm block 902.

Figure 9B:
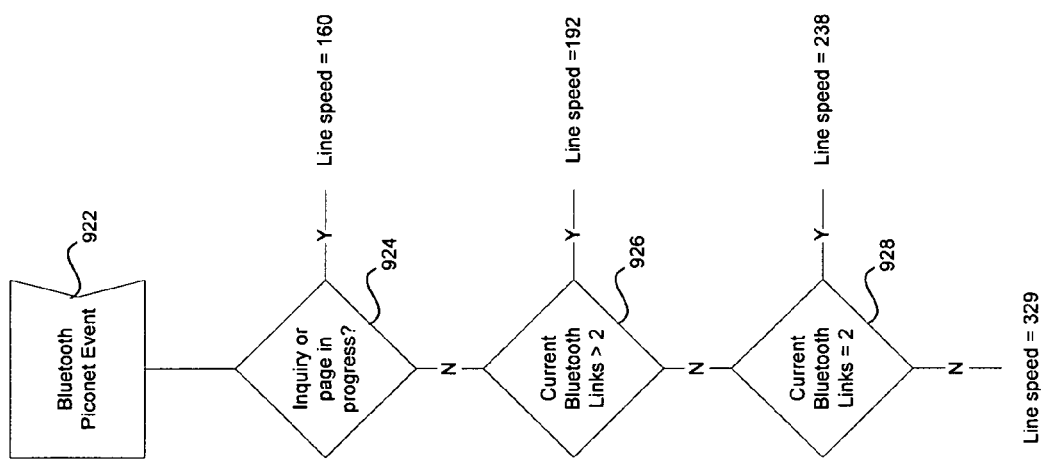
FIG. 9b is a flow chart illustrating an exemplary algorithm that may be utilized for adjusting line speed or data rate, in accordance with an embodiment of the invention.

FIG. 9b is a flow chart illustrating an exemplary algorithm that may be utilized for adjusting line speed or data rate, in accordance with an embodiment of the invention. Referring to FIG. 9b, in step 922, Bluetooth® piconet events may be communicated to the line speed algorithm. In step 924, it may be determined whether an inquiry or page is in progress. If an inquiry or page is in progress during an inquiry active event, for example, then the line speed may be set at 160. If an inquiry or page is not in progress, then in step 926, it may be determined whether the current Bluetooth® links are greater than 2.

In an illustrative embodiment of the invention, during an exemplary devices in piconet event received by the Bluetooth® device, a number of Bluetooth® devices and Bluetooth® links in a piconet may be determined. If the number current Bluetooth® links is greater than 2, then the line speed may be set at 192. If the number of current Bluetooth® links is not greater than 2, then in step 928, it may be determined whether the current Bluetooth® links is equal to 2. If it is determined that the number of current Bluetooth® links is equal to 2, then the line speed may be set to 238. However, if it is determined that the number of current Bluetooth®® links are not equal to 2, then the line speed may be set to 329. It should be recognized that the invention is not limited to the line speeds that are illustrated in FIG. 9b. Accordingly, other line speeds may be utilized without departing from the various aspects of the invention. Furthermore, the line speeds may be increased or decreased incrementally.

Figure 10:
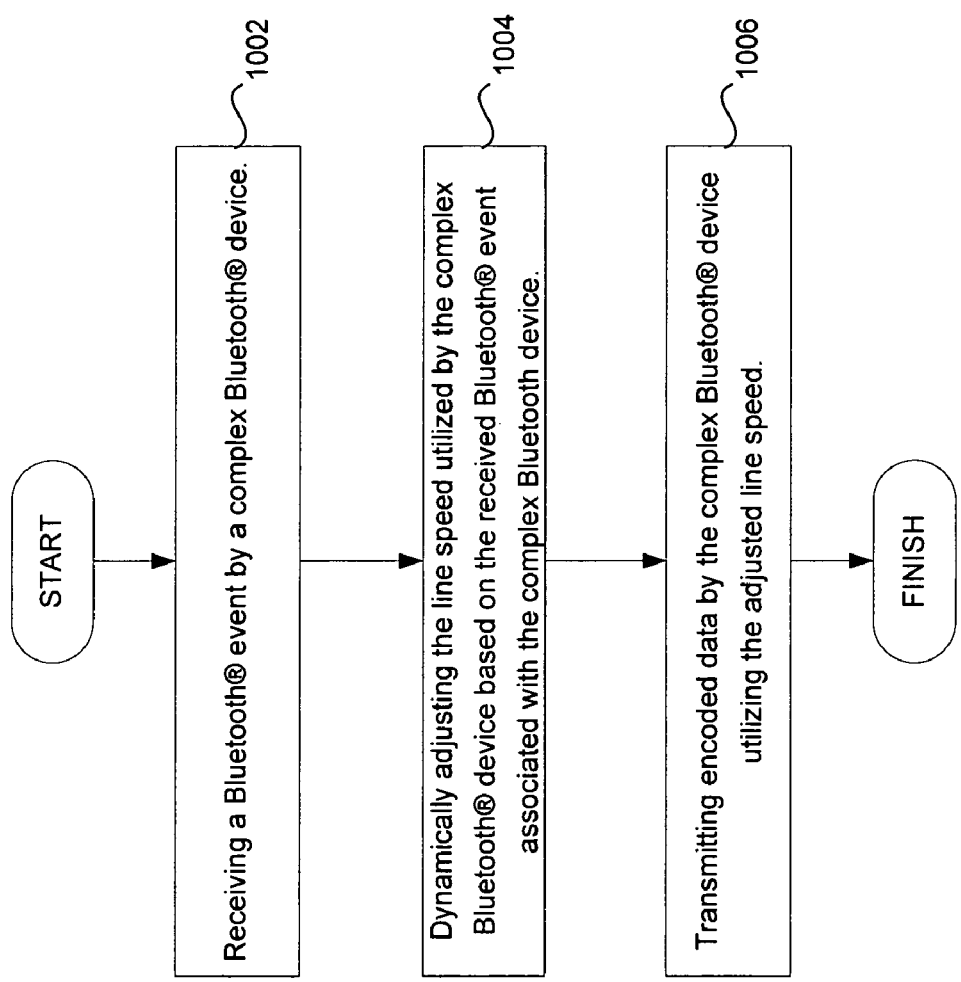
FIG. 10 is a flow diagram illustrating exemplary steps for controlling a personal area network access device, in accordance with an embodiment of the invention.

FIG. 10 is a flow diagram illustrating exemplary steps for controlling a personal area network access device, in accordance with an embodiment of the invention. Referring to FIG. 10, at 1002, a Bluetooth® event may be received by a complex Bluetooth® device. At 1004, the line speed utilized by the complex Bluetooth® device may be dynamically adjusted based on the received Bluetooth® event associated with the complex Bluetooth device. At 1006, encoded data may be transmitted by the complex Bluetooth® device utilizing the adjusted line speed.

Figure 11:
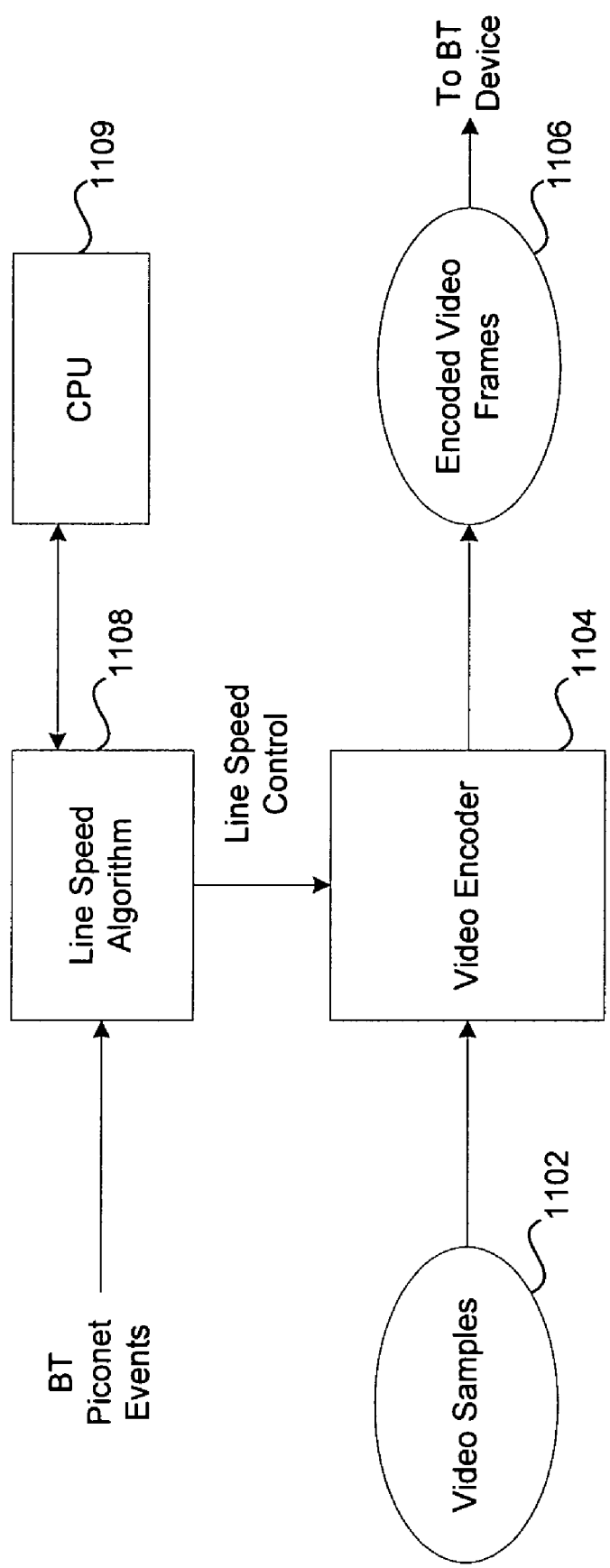
FIG. 11 is a block diagram of an exemplary system for dynamically changing video stream bit rate based on conditions of a Bluetooth® (BT) connection, in accordance with an embodiment of the invention.

FIG. 11 is a block diagram of an exemplary system for dynamically changing video stream bit rate based on conditions of a Bluetooth® (BT) connection, in accordance with an embodiment of the invention. Referring to FIG. 11, there are shown video samples 1102, video encoder 1104, encoded video frames 1106, line speed or data rate algorithm 1108, and a central processing unit (CPU) 1109.

The video samples 1102 may comprise raw digitized video signals. The video encoder 704 may comprise, for example, H.263 baseline encoder, MPEG4 Visual Simple Profile encoder, H.263 profile 3 encoder, and/or H.263 profile 8 encoder. The video encoder 1104 may be a variable rate video encoder, which may comprise a line speed control signal and may be adapted to receive input from the line speed algorithm 1108. The encoded video frames 1106 are encoded output frames, which have been encoded by the video encoder 1104 based on the line speed control signal generated by the line speed algorithm 1108.

The line speed or data rate algorithm 1108 may be any combination of hardware and software controlled. The line speed algorithm 1108 may be adapted to receive Bluetooth® (BT) piconet events. Based on one or more of the received Bluetooth® events, the CPU 1109 may be adapted to generate one or more line speed control signals and/or parameters that control the video encoder 1104. In an exemplary aspect of the invention, the line speed control signals and/or parameters that control the video encoder 1104 may comprise a "line speed increase" signal, a "line speed decrease" signal, and/or a "set line speed" signal. The "set line speed" signal may be utilized to set line speed to a specific value.

In operation, the video samples 1102 are input to a variable-rate video encoder 1104. The line speed control, which is an input to the video encoder 1104, may control the bit rate of the encoded video frames 1106 in the output bit stream. The line speed, or rate at which the input video samples 1102 are encoded, may be determined and controlled by the line speed algorithm 1108. The CPU 1109 may be adapted to determine an appropriate line speed, or bit rate, depending on the BT piconet event information that is received by the line speed algorithm 1108. The output encoded video frames may be communicated to a peer device over a Bluetooth® connection.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for controlling a personal area network access device, the method comprising:
receiving at least one Bluetooth event by a Bluetooth device;
controlling changes in a line speed used by said Bluetooth device, said controlling based on said at least one received Bluetooth event; and
selecting said line speed from a plurality of line speeds, said selecting based on said received at least one Bluetooth event.

2. The method according to claim 1, comprising dynamically adjusting said line speed utilized by said Bluetooth device based on said at least one received Bluetooth event associated with said Bluetooth device.

3. The method according to claim 1, comprising dynamically adjusting said line speed utilizing a line speed algorithm.

4. The method according to claim 3, wherein said line speed algorithm comprises a variable bit rate coding algorithm.

5. The method according to claim 1, comprising transmitting encoded data by said Bluetooth device utilizing said line speed.

6. The method according to claim 5, wherein said encoded data comprises encoded audio data.

7. The method according to claim 1, comprising controlling said line speed based on a current line speed of said Bluetooth device.

8. The method according to claim 1, wherein said received at least one Bluetooth event comprises: one or more of a device in/out piconet event, an inquiry start/stop event, a flush time out event, a master/slave role event, a QoS/poll interval event, a power savings mode event, and/or a simultaneous profiles event.

9. The method according to claim 1, comprising controlling said line speed based on a current configuration of said Bluetooth device.

10. A computer-readable storage having stored thereon, a computer program having at least one code section for controlling a personal area network access device, the at least one code section being executable by a computer for causing the computer to perform steps comprising:

receiving at least one Bluetooth event by a Bluetooth device;

controlling changes in a line speed used by said Bluetooth device based on said at least one received Bluetooth event; and selecting said line speed from a plurality of line speeds, said selecting based on said received at least one Bluetooth event.

11. The computer-readable storage according to claim 10, comprising code for dynamically adjusting said line speed utilized by said Bluetooth device based on said at least one received Bluetooth event associated with said Bluetooth device.

12. The computer-readable storage according to claim 10, comprising code for dynamically adjusting said line speed utilizing a line speed algorithm.

13. The computer-readable storage according to claim 12, wherein said line speed algorithm comprises a variable bit rate coding algorithm.

14. The computer-readable storage according to claim 10, comprising code for transmitting encoded data by said Bluetooth device utilizing said line speed.

15. The computer-readable storage according to claim 14, wherein said encoded data comprises encoded audio data.

16. The computer-readable storage according to claim 10, comprising code for controlling said line speed based on a current line speed of said Bluetooth device.

17. The computer-readable storage according to claim 10, wherein said received at least one Bluetooth event comprises: one or more of a device in/out piconet event, an inquiry start/stop event, a flush time out event, a master/slave role event, a QoS/poll interval event, a power savings mode event, and/or a simultaneous profiles event.

18. The computer-readable storage according to claim 10, comprising code for controlling said line speed based on a current configuration of said Bluetooth device.

19. A system for controlling a personal area network access device, the system comprising:

at least one processor that receives at least one Bluetooth event by a Bluetooth device;

said at least one processor controls changes in a line speed used by said Bluetooth device based on said at least one received Bluetooth event; wherein said at least one processor dynamically adjusts said line speed utilized by said Bluetooth device, said dynamic adjustment based on said at least one received Bluetooth event associated with said Bluetooth device.

20. The system according to claim 19, wherein said at least one processor dynamically adjusts said line speed utilizing a line speed algorithm.

21. The system according to claim 20, wherein said line speed algorithm comprises a variable bit rate coding algorithm.

22. The system according to claim 19, wherein said at least one processor transmits encoded data by said Bluetooth device utilizing said line speed.

* * * * *